United States Patent [19]
Nguyen et al.

[11] Patent Number: 5,960,878
[45] Date of Patent: Oct. 5, 1999

[54] METHODS OF PROTECTING WELL TUBULAR GOODS FROM CORROSION

[75] Inventors: Philip D. Nguyen; James R. Stanford; Jimmie D. Weaver, all of Duncan, Okla.

[73] Assignee: Halliburton Energy Services, Inc., Duncan, Okla.

[21] Appl. No.: 09/021,252

[22] Filed: Feb. 10, 1998

Related U.S. Application Data

[63] Continuation-in-part of application No. 08/858,312, May 19, 1997, Pat. No. 5,775,425, which is a continuation-in-part of application No. 08/725,368, Oct. 3, 1996, Pat. No. 5,787,986, which is a continuation-in-part of application No. 08/510,399, Aug. 2, 1995, Pat. No. 5,582,249, which is a continuation-in-part of application No. 08/412,688, Mar. 29, 1995, Pat. No. 5,501,274.

[51] Int. Cl.[6] .............. E21B 41/02; E21B 43/04
[52] U.S. Cl. ............ 166/276; 166/278; 166/310; 166/902; 507/244; 507/939
[58] Field of Search ................ 166/244.1, 276, 166/278, 279, 310, 371, 902; 507/239, 240, 244, 939

[56] References Cited

U.S. PATENT DOCUMENTS

| | | | |
|---|---|---|---|
| 2,546,586 | 3/1951 | Cross, Jr. ................ | 166/310 |
| 3,443,637 | 5/1969 | Sparlin et al. ............ | 166/295 |
| 4,323,124 | 4/1982 | Swan ...................... | 166/278 X |
| 4,660,642 | 4/1987 | Young ..................... | 166/278 X |
| 4,670,166 | 6/1987 | McDougall et al .......... | 166/278 X |
| 5,501,274 | 3/1996 | Nguyen et al. . | |
| 5,582,249 | 12/1996 | Caveny et al. . | |
| 5,652,296 | 7/1997 | Randen . | |
| 5,721,302 | 2/1998 | Wood et al. . | |
| 5,723,538 | 3/1998 | Fischer . | |
| 5,775,425 | 7/1998 | Weaver et al. ............ | 166/276 |
| 5,787,986 | 8/1998 | Weaver et al. ............ | 166/276 X |
| 5,838,048 | 12/1998 | Weaver et al. ............ | 166/902 X |
| 5,871,049 | 2/1999 | Weaver et al. ............ | 166/276 |

*Primary Examiner*—George Suchfield
*Attorney, Agent, or Firm*—Robert A. Kent

[57] ABSTRACT

The present invention provides methods of protecting ferrous metal well tubular goods and the like disposed in a well bore penetrating a subterranean formation from corrosion. The method basically includes the steps of introducing a liquid or solution of a tackifying compound having ferrous metal corrosion inhibition properties into the well bore whereby the tackifying compound is coated onto the tubular goods thereby providing extended corrosion protection to the tubular goods. Thereafter, formation fluids are produced from the subterranean formation.

9 Claims, No Drawings

METHODS OF PROTECTING WELL TUBULAR GOODS FROM CORROSION

CROSS-REFERENCE TO RELATED APPLICATIONS

This application is a continuation-in-part of application Ser. No. 08/858,312, filed May 19, 1997, now U.S. Pat. No. 5,775,425, which is a continuation-in-part of application Ser. No. 08/725,368, filed Oct. 3, 1996, now U.S. Pat. No. 5,787,986, which is a continuation-in-part of application Ser. No. 08/510,399 filed Aug. 2, 1995, now U.S. Pat. No. 5,582,249, which is a continuation-in-part of application Ser. No. 08/412,688, filed on Mar. 29, 1995, now U.S. Pat. No. 5,501,274.

BACKGROUND OF THE INVENTION

1. Field of the Invention

This invention relates to improved methods of protecting ferrous metal well tubular goods and the like disposed in a well bore penetrating a subterranean producing formation.

2. Description of the Prior Art

In the treatment of subterranean producing formations, it is common to place particulate materials as a filter medium and/or a proppant in the near well bore area and in fractures extending outwardly from the well bore. In fracturing operations, particulate proppant, e.g., sand, is carried into fractures created when hydraulic pressure is applied to a subterranean rock formation to the point where fractures are developed therein. Proppant suspended in a viscosified fracturing fluid is carried outwardly away from the well bore within the fractures as they are created and extended with continued pumping. Upon release of the pumping pressure, the proppant remains in the fractures holding the separated rock faces in open positions and forming channels for the flow of produced formation fluids back to the well bore.

In unconsolidated formations, it is common to place a filtration bed of particulate gravel in the near well bore area in order to present a physical barrier to the transport of unconsolidated formation fines with the production of formation fluids. Typically, such so-called "gravel packing" operations involve the pumping and placement of a quantity of gravel and/or sand having a mesh size between about 10 mesh and 60 mesh on the U.S. Standard Sieve Series into the annulus between a screen and the walls of the well bore in an unconsolidated formation. The gravel particles form a porous matrix through which formation fluids can pass while screening out and retaining the bulk of the unconsolidated sand and/or fines transported to the near well bore area by the formation fluids.

Subterranean hydrocarbon producing formations are often stimulated by contacting the formations with an aqueous acid solution. The acid can be pumped directly into a formation to increase the hydrocarbon permeability of the formation or it can be pumped into fractures formed in a formation to produce flow channels in the fracture faces. Aqueous acid solutions are also commonly utilized as cleaning agents in the well bore to clean out perforations and to remove formation damage in the near well bore area. Heretofore, corrosion inhibitors have been added to the acid solutions used to prevent the corrosion of the ferrous metal surfaces of tubular goods and the like in the well bore. However, some acid corrosion can occur in spite of the presence of corrosion inhibitors. Also, the corrosion of the ferrous metal surfaces often takes place as a result of the production of corrosive fluids from the producing formation, e.g., aqueous acid solutions formed by the contact of produced water with acid gases such as hydrogen sulfide and carbon dioxide.

Thus, there are needs for improved methods of preventing the corrosion of ferrous metal tubular goods by acids injected into subterranean producing formations as well as acids and other corrosive fluids produced from subterranean formations.

SUMMARY OF THE INVENTION

The present invention provides improved methods of protecting ferrous metal well tubular goods and the like disposed in a well bore penetrating a subterranean formation from corrosion which meet the needs described above and overcome the deficiencies of the prior art. The methods basically comprise the steps of introducing a liquid or solution of a tackifying compound having ferrous metal corrosion inhibition properties into the well bore whereby the tackifying compound is coated onto the ferrous metal tubular goods in the well bore. The presence of the corrosion inhibiting tackifying compound coating on the tubular goods provides extended corrosion protection to the tubular goods.

It is, therefore, a general object of the present invention to provide improved methods of protecting tubular goods and the like disposed in well bores from corrosion.

Other objects, features and advantages of the present invention will be readily apparent to those skilled in the art upon a reading of the description of preferred embodiments which follows.

DESCRIPTION OF PREFERRED EMBODIMENTS

In accordance with the present invention, a liquid or solution of a tackifying compound having ferrous metal corrosion inhibition properties is introduced into a well bore penetrating a subterranean formation having ferrous metal tubular goods therein. The tackifying compound is coated onto the tubular goods whereby the tubular goods are protected from corrosion. In alternate embodiments of the invention, particulate proppant or gravel is impregnated and/or coated with the tackifying compound prior to placing the proppant in one or more fractures in a subterranean formation or prior to forming a gravel pack in a subterranean formation. When the subterranean formation containing the impregnated and/or coated proppant or gravel is produced, the tackifying compound is slowly released or displaced from the proppant or gravel whereby it coats ferrous metal tubular goods in the well bore thereby providing continuous and extended corrosion protection to the tubular goods.

The term "tubular goods" is used herein to mean casing, tubing, liners, screens, valves, and other corrodible apparatus which may be disposed in a well bore or subterranean formation.

The impregnated and/or coated particulate proppant or gravel may comprise substantially any porous or other substrate material that does not undeseriably chemically interact with other components used in treating the subterranean formation. The material may comprise sand, ceramics, glass, sintered bauxite, porous resin beads, metal beads and the like. The impregnated and/or coated particulate material may also include an additional material that is admixed with the particulate and introduced into a subterranean formation to reduce particulate flowback. The additional material may comprise glass, ceramic, carbon composites, natural or synthetic polymers or metal and the like in the form of fibers, flakes, ribbons, beads, shavings, platelets and the like. The additional material generally will be admixed with the particulate in an amount of from about 0.1% to about 5% by weight of the particulate.

The tackifying compound comprises a liquid or a solution of a compound capable of forming a coating upon tubular goods and impregnating and/or coating the above described particulates with which it comes into contact prior to or subsequent to placement in the subterranean formation. In some instances, the tackifying compound may be a solid at ambient surface conditions and after heating upon entry into the well bore and the subterranean formation becomes a melted liquid which coats tubular goods in the well bore and at least partially impregnates and/or coats a portion of the particulate. Compounds suitable for use as a tackifying compound comprise substantially any compounds which when in liquid form or in a solvent solution will impregnate and/or form a non-hardening coating, by themselves, upon the surfaces of ferrous metal tubular goods and particulate, and will provide corrosion protection to the tubular goods.

A particularly preferred group of corrosion inhibiting tackifying compounds comprise polyamides which are liquids or in solvent solution at the temperature of the subterranean formation to be treated such that the polyamides are, by themselves, non-hardening when present on tubular goods or on particulate in or introduced into the subterranean formation. A particularly preferred product is a condensation reaction product comprised of commercially available polyacids and a polyamine. Such commercial products include compounds such as mixtures of $C_{36}$ dibasic acids containing some trimer and higher oligomers and also small amounts of monomer acids which are reacted with polyamines. Other polyacids include trimer acids, synthetic acids produced from fatty acids, maleic anhydride, acrylic acid and the like. Such acid compounds are available from companies such as Witco Corporation, Union Camp, Chemtall, and Emery Industries. The reaction products are available from, for example, Champion Technologies, Inc. and Witco Corporation.

In general, the polyamides of the present invention are commercially produced in batchwise processing of polyacids predominately having two or more acid functionalities per molecule with a polyamine. As is well known in the manufacturing industry, the polyacids and polyfunctional amines are introduced into a reactor where, with agitation, the mildly exothermic formation of the amide salt occurs. After mixing, heat is applied to promote endothermic dehydration and formation of the polymer melt by polycondensation. The water of reaction is condensed and removed leaving the polyamide. The molecular weight and final properties of the polymer are controlled by choice and ratio of feedstock, heating rate and judicious use of monofunctional acids and amines to terminate chain propagation. Generally an excess of polyamine is present to prevent runaway chain propagation. Unreacted amines can be removed by distillation, if desired. Often a solvent, such as an alcohol, is admixed with the final condensation reaction product to produce a liquid solution that can readily be handled. The condensation reaction generally is accomplished at a temperature of from about 225° F. to about 450° F. under a nitrogen sweep to remove the condensed water from the reaction. The polyamines can comprise, for example, ethylenediamine, diethylenetriamine, triethylene tetraamine, amin ethyl piperazine and the like.

The polyamides can be converted to quaternary compounds by reaction with methylene chloride, dimethyl sulfate, benzylchloride, diethyl sulfate and the like. Typically the quaternization reaction would be effected at a temperature of from about 100° F. to about 200° F. over a period of from about 4 to 6 hours. The quaternization reaction may be employed to improve the corrosion inhibition properties of the polyamide tackifying compounds or the chemical compatibility of the tackifying compounds with the other chemicals utilized in the treatment fluids. Quaternization of the polyamide compounds can also reduce effects upon breakers in the treatment fluids used and reduce or minimize the buffer effects of the compounds when present in the fluids.

The liquid or solution of the tackifying compound used is generally admixed with the particulate to be impregnated and/or coated in an amount in the range of from about 0.05% to about 3% of active tackifying compound by weight of the particulate.

When the tackifying compound is utilized with another material that is admixed with the particulate and which is at least partially impregnated and/or coated with the tackifying compound, such as glass fibers or the like, the tackifying compound is admixed with the other material in an amount in the range of from about 10% to about 250% of active tackifying compound by weight of the glass fibers or other added material. Preferably, the tackifying compound is first admixed with the other material in an amount of from about 10% to about 150% of the active tackifying compound by weight of the other material and then added to the particulate.

The liquid or solution of tackifying compound interacts mechanically with the particles of particulate proppant introduced into fractures in a subterranean formation and fines in the formation to limit or prevent the flowback of fines to the well bore.

The liquid or solution of tackifying compound generally is incorporated with particulate proppant or gravel in any of the conventional fracturing or gravel packing fluids comprised of an aqueous fluid, an aqueous foam, a hydrocarbon fluid or an emulsion, a viscosifying agent and any of the various known breakers, buffers, surfactants, clay stabilizers or the like.

Generally, the tackifying compound may be incorporated into fluids having a pH in the range of from about 3 to about 12 for introduction into a subterranean formation. The compounds are useful in reducing particulate movement within the formation at temperatures from about ambient to in excess of 275° F. It is to be understood that not every tackifying compound will be useful over the entire pH or temperature range but every compound is useful over at least some portion of the range and individuals can readily determine the useful operating range for various products utilizing well known tests and without undue experimentation.

The incorporation of or addition of certain surfactants to the liquid or solution of the tackifying compound or to a fracturing or carrying fluid containing suspended particulate can improve or facilitate the impregnation and/or coating of the tackifying compound on tubular goods and on the particulate. The addition of selected surfactants has been found to be beneficial at both elevated fluid salinity and elevated fluid pH as well as at elevated temperatures. The surfactants appear to improve the wetting of the tubular goods and/or particulates by the tackifying compound. Suitable surfactants include nonionics such as long chain carboxylic esters, e.g., propylene glycol, sorbitol and polyoxyethylenated sorbitol esters, polyoxyethylenated alkylphenols, alkyphenol, ethoxylates, alkyglucosides, alkanolamine condensates and alkanolamides; anionics such as carboxylic acid salts, sulphonic acid salts, sulfuric ester salts and phosphonic and polyphosphoric acid esters; cationics such as long chain amines and their salts, quaternary ammonium salts, polyoxyethylenated long chain amines and quaternized polyoxyethylenated long chain amines; and zwitterions such as n-alkylbetaines. Of the various surfactants that can be used, sulphonic acid salts, quaternary ammonium salts, and polyphosphoric acid esters are generally preferred. The surfactant used is generally included in or with the liquid or solution of tackifying compound in an amount in the range of from about 0.1% to about 25% by weight of the tackifying compound therein.

The liquid or solution of tackifying compound generally is admixed with the particulate proppant or gravel by introduction into a fracturing fluid or carrying fluid along with the particulate. When a surfactant is utilized, it can also be introduced into the fracturing or carrying fluid.

Fracturing fluids are introduced into the subterranean formation at a rate and pressure sufficient to create at least one fracture in the formation into which particulate proppant is then introduced to prop the created fracture open and facilitate formation fluid production. Gravel packing treatments generally are performed at lower rates and pressures whereby the carrying fluid used can be introduced into a formation to create a controlled particle size pack surrounding a screen positioned in the well bore, i.e., in the annulus between the screen and the walls of the well bore, without causing fracturing of the formation. The particulate pack surrounding the well bore then functions to prevent fines or formation particulate migration into the well bore with the production of formation fluids from the subterranean formation.

The liquid or solution of the tackifying compound may be introduced into the fracturing or gravel carrying fluid before, after or simultaneously with the introduction of the particulate proppant or gravel into the fluid. The liquid or solution of tackifying compound may be incorporated with the entire quantity of particulate introduced into the subterranean formation or it may be introduced with only a portion of the particulate, such as in the final stages of a fracturing treatment to place the tackifying compound impregnated and/or coated particulate in the formation in the vicinity of the well bore. The tackifying compound may be introduced into a blender or into any flowline in which it will contact the particulate to be impregnated and/or coated with the tackifying compound. The tackifying compound may be introduced with metering pumps or the like prior to entry of the treatment fluid into the subterranean formation. In an alternative embodiment, the particulate may be premixed with the tackifying compound prior to admixing with a treatment fluid for use in a subterranean formation.

When a polyamide or quaternized polyamide is utilized as the tackifying compound, ferrous metal tubular goods in contact with a liquid or solution of the tackifying compound exhibit extended corrosion inhibition. It has been determined that minute amounts of the polyamide or quaternized polyamide are released or displaced from the impregnated and/or coated particulate by formation fluids flowing through the formation and into the well bore and that such released or displaced amounts provide corrosion protection to the ferrous metal tubular goods contacted thereby. The polyamide or quaternized polyamide coats or forms a thin film on the ferrous metal surfaces which protect them from corrosion as a result of contact with corrosive aqueous fluids. As indicated above, the tubular goods can also be coated directly by contacting them with a liquid or solution of a polyamide or quaternized polyamide tackifying compound to provide corrosion protection to the tubular goods.

As indicated above, the tackifying compound can be admixed with a solvent, such as, for example, crude oil, distillates, butyl alcohol, isopropyl alcohol, a heavy aromatic solvent such as xylene, toluene, heavy aromatic naptha or the like and mutual solvents such as ethylene glycol monobutyl ether, propylene carbonate or n-methylpyrolidone or the like. The tackifying compound generally will be present in an amount of from about 0.5% to about 30% by volume of the mixture. The diluted tackifying compound can be used to directly coat the tubular goods in the well bore as well as to coat the materials making up the subterranean formation adjacent to the well bore with the tackifying compound.

The coating of the particulate proppant or gravel with the tackifying compound causes the larger particles to subsequently tend to adhere to one another resulting in the formation of particulate bridges in the propped fractures or gravel pack upon the resumption of formation fluid production. As fines in the produced fluids contact the tackifying compound coated particulates, the fines tend to become bound to the larger particulates and are prevented from migrating through the proppant or gravel pack with produced fluids. Introduction of the tackifying compound solution into the subterranean formation at matrix flow rates (rates below that necessary to exceed the fracture gradient and cause fractures in the formation) tends to minimize the possibility of additional fines released within the formation. If it is desired to redistribute proppant in a subterranean formation or reopen or extend fractures into the subterranean formation, the tackifying compound solution can be introduced into the subterranean formation at a rate and pressure sufficient to fracture the subterranean formation. Any fines that may be produced as a result of the fracturing operation tend to become bound to and adhere to the particulate that is at least partially coated by the tackifying compound as it is deposited within the subterranean formation.

The improved methods of the present invention for protecting ferrous metal well tubular goods disposed in well bores are comprised of the following steps. A liquid or solution of a tackifying compound having ferrous metal corrosion inhibition properties is introduced into the well bore. As a result, the tackifying compound is coated onto the tubular goods in the well bore. The tackifying compound provides extended corrosion protection to the tubular goods during or after the well is treated with an aqueous acid solution and as a result of being contacted with produced corrosive aqueous fluids. After the coating of the tubular goods has been accomplished, formation fluids are produced from the subterranean formation.

An alternate method of the present invention which is utilized when a subterranean producing formation penetrated by a well bore is to be fracture stimulated comprises the following steps. A fracturing fluid is introduced into the subterranean formation at a rate and pressure sufficient to create at least one fracture in the formation. A particulate proppant is admixed with a portion of the fracturing fluid along with an effective amount of a liquid or solution of a tackifying compound having ferrous metal corrosion inhibition properties whereby at least a portion of the particulate is impregnated and/or coated with the tackifying compound. The tackifying compound impregnated and/or coated particulate is subsequently introduced into and deposited in the fracture. Thereafter, fluids from the formation are produced by way of the fracture whereby portions of the tackifying compound are released and/or displaced from the coated particulate which coat ferrous metal tubular goods disposed in the well bore whereby they are protected from corrosion.

If desired, before the formation is returned to production, an effective amount of liquid or solution of the tackifying compound can be introduced into the well bore to thereby precoat the tubular goods in the well bore with the tackifying compound.

When a gravel pack is to be formed in a well bore containing ferrous metal tubular goods and penetrating a subterranean formation, a method of the present invention can be performed as follows. A carrying fluid having a particulate gravel impregnated and/or coated with a liquid or solution of a tackifying compound having ferrous metal corrosion inhibition properties is prepared. The carrying fluid containing the impregnated and/or coated particulate gravel is introduced into the annulus between the walls of the well bore and a screen disposed therein whereby a permeable pack of the impregnated and/or coated particulate is formed in the subterranean formation. Thereafter, formation fluids are produced from the formation by way of the permeable pack of impregnated and/or coated particulate whereby portions of the tackifying compound are released and/or displaced from the impregnated and/or coated particulate which coat the ferrous metal tubular goods whereby they are protected from corrosion. As mentioned above, prior to placing the formation on production, a liquid or solution of the tackifying compound can be introduced into the well bore to precoat the tubular goods therein with the tackifying compound.

In order to further illustrate the methods of the present invention, the following examples are given.

EXAMPLE 1

Flow tests to verify the slow release of a polyamide tackifying compound coating on sand was conducted. A slurry consisting of 300 grams of 20/40 Brady sand and 256 milliliters of linear low viscosity guar gel (25 pounds of guar/1,000 gallons of water) cross-linked with a borate cross-linker was prepared. The sand slurry was then mixed with 6 milliliters of a solution of polyamide tackifying agent and poured into a glass tube (0.87 inch in diameter by 18 inches in length). The glass tube was connected to a pump whereby water and diesel oil could be flowed through the tube. A ferrous metal screen was placed at the outlet end of the tube so that the water and diesel oil flowed through the screen.

Water was first flowed through the sand pack in the glass tube to displace the gel followed by diesel oil. The diesel oil was then continuously circulated through the sand pack at a flow rate of 9 milliliters per minute. The temperature of the diesel oil and the sand pack was maintained at approximately 100° F. After the initial flow of water and at various times during the flow of diesel oil through the sand pack, a sample of the sand pack was removed and tested to determine the amount of polyamide tackifying compound coated thereon. The results of the tests are as follows:

| Time Diesel Oil Circulated Through Tube Containing Coated Sand Pack, Days | Amount of Polyamide Remaining on the Sand, % by Weight of the Sand |
| --- | --- |
| Initial (after water flow) | 0.86 |
| 5 | 0.59 |
| 8 | 0.58 |

From the above, it can be seen that after an initial quick release of the tackifying compound from the sand pack, portions of the tackifying compound were slowly displaced from the sand pack.

EXAMPLE 2

Corrosion wheel inhibitor tests were conducted to evaluate the film persistency of a polyamide tackifying compound on 3 inch by ½ inch wide by 0.005 inch thick steel corrosion coupons. The polyamide tested was the condensation reaction product of a dimer acid containing some trimer and higher oligomers and some monomer acids and diethylenetriamine.

Kerosene and synthetic brine were utilized in the tests to simulate water and hydrocarbons in a subterranean formation and carbon dioxide or carbon dioxide and hydrogen sulfide were utilized to form and simulate corrosive subterranean formation aqueous fluids.

The test procedure utilized is as follows. Quantities of synthetic brine to be used in the tests were placed in two separate containers of about 5 gallon capacity. Quantities of kerosene to be used in the test were placed in two additional containers of the same capacity. One of the containers of synthetic brine and one of the containers of kerosene were purged with carbon dioxide for a minimum of six hours. The other containers of synthetic brine and kerosene were purged with carbon dioxide for a minimum of six hours followed by an additional 15 to 20 minute purge with hydrogen sulfide.

Portions of the above described polyamide tackifying compound were dispensed into a number of test bottles. Those bottles as well as other empty test bottles were placed under a purging manifold, and a previously cleaned and weighed corrosion coupon was placed in each bottle. Thereafter, 108 milliliter portions of purged synthetic brine followed by 12 milliliter portions of purged kerosene were measured into the bottles and the bottles were capped. The bottles were then placed on a rotating wheel along with the additional bottles containing corrosion coupons, synthetic brine and kerosene, but without the polyamide tackifying compound. The environment surrounding the rotating wheel was controlled at a temperature of about 160° F.

The test bottles were rotated for one hour to form a film of corrosion inhibiting tackifying compound on each coupon. The test bottles containing corrosion coupons which did not contain the tackifying compound (blank coupons) were left on the wheel to rotate while the test bottles with the tackifying compound were removed from the wheel. Each coupon in the removed test bottles was transferred to a previously prepared new test bottle containing only synthetic brine and kerosene. The corrosion coupons in the new bottles were then placed on the wheel to rotate an additional hour to thereby remove any loose tackifying compound. Thereafter, the coupons having tackifying compound coated thereon were removed from the bottles and transferred to previously prepared additional bottles containing synthetic brine and kerosene which were placed back on the wheel and allowed to rotate for the duration of the test, i.e., 72 hours or 24 hours.

At the end of the test periods, the test bottles containing both the blank coupons and polyamide coated coupons were removed from the wheel, visual observations were made and the coupons were retrieved from the bottles. The coupons were then cleaned with inhibited acid solutions, rinsed with water and isopropyl alcohol, thoroughly dried and weighed to an accuracy of 0.0001 gram.

The percent protection provided by the polyamine tackified compound was calculated in accordance with the following relationship:

$$\% \text{ Protection} = \frac{(\text{Blank coupon weight loss} - \text{Test coupon weight loss})}{\text{Blank weight loss}} \times 100$$

The results of these tests are given in Tables I, II and III below.

TABLE I

CORROSION TEST - 72 HOUR DURATION

| Coupon No. | Purge Gas Used | Initial Weight, grams | Final Weight, grams | Weight Loss, milligrams | Polyamide Concentration in Test Bottles, ppm | Percent Protection |
|---|---|---|---|---|---|---|
| 1 | $CO_2$ | 0.9959 | 0.9839 | 12.0 | 2500 | 85.2 |
| 2 | $CO_2$ | 0.9359 | 0.9245 | 11.4 | 2500 | 85.9 |
| 3 | $CO_2$ | 1.0453 | 1.0337 | 11.6 | 2500 | 85.7 |
| 4 | $CO_2$ | 1.0273 | 1.0186 | 8.7 | 50 | 89.3 |
| 5 | $CO_2$ | 1.0049 | 0.9939 | 11.0 | 50 | 86.4 |
| 6 | $CO_2$ | 1.0058 | 0.9942 | 11.6 | 50 | 85.7 |
| 7(Blank)[1] | $CO_2$ | 0.9147 | 0.8311 | 83.6 | 0 | — |
| 8(Blank)[1] | $CO_2$ | 1.0790 | 1.0001 | 78.9 | 0 | — |
| 9(Blank)[1] | $CO_2$ | 1.0152 | 0.9346 | 80.6 | 0 | — |

[1]Average blank weight loss equals 81.0 mg.

TABLE II

CORROSION TEST - 24 HOUR DURATION

| Coupon No. | Purge Gas Used | Initial Weight, grams | Final Weight, grams | Weight Loss, milligrams | Polyamide Concentration in Test Bottles, ppm | Percent Protection |
|---|---|---|---|---|---|---|
| 1 | $CO_2$ & $H_2S$ | 0.9206 | 0.9206 | 4.9 | 2500 | 83.8 |
| 2 | $CO_2$ & $H_2S$ | 0.8995 | 0.8995 | 4.9 | 2500 | 83.8 |
| 3 | $CO_2$ & $H_2S$ | 0.9439 | 0.9439 | 3.9 | 2500 | 87.1 |
| 4 | $CO_2$ & $H_2S$ | 0.9609 | 0.9609 | 3.4 | 50 | 88.7 |
| 5 | $CO_2$ & $H_2S$ | 0.9226 | 0.9226 | 2.9 | 50 | 90.4 |
| 6 | $CO_2$ & $H_2S$ | 0.9412 | 0.9412 | 3.7 | 50 | 87.7 |
| 7(Blank)[1] | $CO_2$ & $H_2S$ | 0.9423 | 0.9423 | 32.6 | 0 | — |
| 8(Blank)[1] | $CO_2$ & $H_2S$ | 0.8347 | 0.8347 | 26.5 | 0 | — |
| 9(Blank)[1] | $CO_2$ & $H_2S$ | 0.9445 | 0.9445 | 31.6 | 0 | — |

[1]Average blank weight loss equals 32 mg.

TABLE III

CORROSION TEST - 24 HOUR DURATION

| Coupon No. | Purge Gas Used | Initial Weight, grams | Final Weight, grams | Weight Loss, milligrams | Polyamide Concentration in Test Bottles, ppm | Percent Protection |
|---|---|---|---|---|---|---|
| 1 | $CO_2$ & $H_2S$ | 0.9512 | 0.9495 | 1.7 | 2500 | 94.4 |
| 2 | $CO_2$ & $H_2S$ | 0.9089 | 0.9069 | 2.0 | 2500 | 93.4 |
| 3 | $CO_2$ & $H_2S$ | 0.9027 | 0.9012 | 1.5 | 2500 | 95.0 |
| 4 | $CO_2$ & $H_2S$ | 0.9658 | 0.9619 | 3.9 | 50 | 87.1 |
| 5 | $CO_2$ & $H_2S$ | 0.9747 | 0.9703 | 4.4 | 50 | 85.4 |
| 6 | $CO_2$ & $H_2S$ | 0.9374 | 0.9328 | 4.5 | 50 | 84.0 |
| 7(Blank)[1] | $CO_2$ & $H_2S$ | 0.9749 | 0.9423 | 32.6 | 0 | — |
| 8(Blank)[1] | $CO_2$ & $H_2S$ | 0.8612 | 0.8347 | 26.5 | 0 | — |
| 9(Blank)[1] | $CO_2$ & $H_2S$ | 0.9761 | 0.9445 | 31.6 | 0 | — |

[1]Average blank weight loss equals 30.2 mg.

From Tables I, II and III, it can be seen that the polyamide tackifying compound utilized provided good film persistence and corrosion protection.

Thus, the present invention is well adapted to carry out the objects and advantages mentioned as well as those which are inherent therein. While numerous changes may be made to the invention by those skilled in the art, such changes are encompassed within the spirit of the invention as defined by the appended claims.

What is claimed is:

1. A method of protecting ferrous metal well tubular goods disposed in a well bore penetrating a subterranean formation from corrosion comprising the steps of:
    (a) preparing a carrying fluid having suspended therein, a particulate gravel impregnated or coated or both with a liquid or solution of a tackifying compound having ferrous metal corrosion inhibition properties;
    (b) introducing said carrying fluid and said particulate gravel impregnated or coated or both with said tackifying compound into the annulus between the walls of said well bore and a screen disposed in said well bore whereby a permeable pack of said particulate is formed in said subterranean formation; and
    (c) producing fluids from said formation by way of said permeable pack of particulate whereby portions of said tackifying compound are released or displaced from said particulate which coat said ferrous metal tubular goods whereby they are protected from corrosion.

2. The method of claim 1 wherein said tackifying compound comprises predominantly a condensation reaction product of a dimer acid containing some trimer and higher oligomers and some monomer acids and a polyamine.

3. The method of claim 2 wherein said polyamine comprises at least one member selected from the group of ethylenediamine, diethylenetriamine, triethylenetetramine, tetraethylene pentamine and aminoethylpiperazine.

4. The method of claim 1 wherein said liquid or solution of a tackifying compound comprises a polyamide.

5. The method of claim 1 wherein said liquid or solution of a tackifying compound comprises a quaternized polyamide.

6. The method of claim 1 wherein said liquid or solution of said tackifying compound impregnated or coated or both on said particulate in accordance with step (a) is present in an amount in the range of from about 0.05% to about 3% of active tackifying compound by weight of said particulate.

7. The method of claim 1 wherein said liquid or solution of a tackifying compound further comprises a surfactant.

8. The method of claim 7 wherein said surfactant is at least one member selected from the group of sulfonic acid salts, quaternary ammonium salts and polyphosphonic acid esters.

9. The method of claim 8 wherein said surfactant is present in said liquid or solution of said tackifying compound in an amount in the range of from about 0.1% to about 25% by weight of said tackifying compound therein.

* * * * *